United States Patent [19]

Josephy et al.

[11] Patent Number: 5,451,283
[45] Date of Patent: Sep. 19, 1995

[54] METHOD OF MAKING A UNIAXIALLY ORIENTED LABEL FILM WITH COMPATIBILIZER

[75] Inventors: Karl Josephy, Los Angeles, Calif.; Mitchell J. Rackovan, Mentor-on-the Lake; Donald F. Kimes, Maple Heights, both of Ohio

[73] Assignee: Avery Dennison Corporation, Pasadena, Calif.

[21] Appl. No.: 93,099

[22] Filed: Jul. 16, 1993

[51] Int. Cl.⁶ .................. B32B 31/30; B32B 31/18; B32B 31/26
[52] U.S. Cl. .................. 156/229; 156/244.11; 156/244.18; 156/244.24; 264/210.1; 264/210.5; 264/210.6; 264/211; 264/211.12
[58] Field of Search .............. 156/229, 244.11, 244.18; 264/176.1, 211, 210.1, 210.5, 210.6, 211.12

[56] References Cited

U.S. PATENT DOCUMENTS

| | | | |
|---|---|---|---|
| 4,386,188 | 5/1983 | Grancio et al. | 264/210.6 X |
| 4,410,482 | 10/1983 | Subramanian | 264/515 |
| 4,615,941 | 10/1986 | Lu | 428/327 |
| 4,770,837 | 9/1988 | Lu et al. | 264/503 |
| 4,888,075 | 12/1989 | Freedman | |
| 5,151,309 | 9/1992 | Dollinger | 428/40 |
| 5,242,650 | 9/1993 | Rackovan et al. | 156/244.11 |

OTHER PUBLICATIONS

BP Chemicals, "Polybond Products" brochure.

*Primary Examiner*—David A. Simmons
*Assistant Examiner*—M. Curtis Mayes
*Attorney, Agent, or Firm*—Renner, Otto, Boisselle & Sklar

[57] ABSTRACT

Physical properties of extruded, uniaxially oriented films useful in label manufacture and formed from blends of olefinic base materials and soft polar additives such as ethylene vinyl acetate (EVA) are changed in a directionally selective manner that improves abrasion resistance while preserving conformability by use of compatibilizers or coupling agents in the blends. Machine direction strength properties, including stiffness and tensile modulus, increase with little or no degradation of cross-direction elongation, and with limited degradation of cross-direction tensile modulus, both required for good label conformability.

4 Claims, 1 Drawing Sheet

METHOD OF MAKING A UNIAXIALLY ORIENTED LABEL FILM WITH COMPATIBILIZER

This invention relates to the conformable labeling of flexible and rigid substrates such as squeeze bottles, glass bottles and the like, and to manufacture of die-cut labels for such uses from resinous film-forming materials which are blends of "soft" polar additives, ethylene vinyl acetate polymer (EVA) being presently preferred, with low-cost olefinic base materials, particularly polypropylene, polyethylene, or combinations thereof including polypropylene-polyethylene copolymer, blends of polypropylene and polyethylene with each other, or blends of either or both of them with polypropylene-polyethylene copolymer. The preferred olefinic base materials are those with very high propylenic content, either polypropylene homopolymer or polypropylene-polyethylene copolymers or polymer blends with very low ethylenic content, say less than 10% or more preferably less than 5%. By soft polar additive is meant a random copolymer of an olefin and a more polar moiety which copolymer is softer than and immiscible in such olefinic base materials. A presently preferred soft polar additive is ethylene vinyl acetate copolymer (EVA).

Such blends of olefinic base materials with soft polar additives therein may be referred to as olefin-soft polar additive blends, or "olefin-SPA blends," and more particularly, when appropriate, as "olefin-EVA blends." The soft polar additives referred to are to be distinguished from "hard" polar additives which include polyamides (e.g. nylon), polyesters (e.g. polyethylene terephthalate (PET)), and polystyrene. Both the hard and soft polar additives are generally characterized by incompatibility with the olefinic base materials, so that the blend of the additive and base forms an immiscible mix of separate domains consisting of one or the other.

BACKGROUND OF THE INVENTION

In many label applications, it is desirable that the label stock from which the labels are cut be a film of polymeric material rather than paper. Polymeric film can provide properties lacking in paper, such as durability, strength, water resistance, abrasion resistance, gloss, transparency and other properties. Obviously, the polymeric material must meet the practical requirements of commercial manufacture and use. Material costs must be competitive. The film must be formable by a suitable commercial process such as cast film extrusion or blown film extrusion, requiring that the molten film material be flowable to the correct degree to accomplish proper film formation. The formed film must be capable of hot-stretching without deleterious effect, since it is generally advantageous to hot-stretch and anneal the formed film, so as to orient the film and impart a stiffness to the film that is different in machine and cross directions, as described for example in U.S. Pat. No. 5,186,782 and U.S. application Ser. No. 08/055,462 filed Apr. 29, 1993, both of common assignee, the disclosures of which are, to the extent consistent herewith, hereby incorporated by reference as if fully repeated herein. The film must have a printable face and be die-cuttable and matrix-strippable when used in a pressure-sensitive label construction. The labels should have enough "give" or flexibility to conform well to the substrates or containers on which they are used (a particularly demanding requirement when the labels are applied to flexible substrates such as squeezable plastic containers, for example shampoo bottles, but also a requirement with respect to rigid substrates which may have irregularities in their surfaces, such as glass bottles). On the other hand, labels cut from the film should be sufficiently dimensionally stable to maintain print registration and stiff enough to allow them to be properly dispensed as an in-mold label, or to dispense properly past a peel plate or peel-back edge, over which the liner or carrier is stripped, at speeds which are high enough to be commercially viable, i.e. in excess of 200 pieces per minute and preferably in excess of at least about 250 pieces per minute, corresponding to line speeds of about 80 to 100 feet per minute. Dispensing at these speeds generally requires a machine-direction (MD) stiffness of between 10 and 60 Gurley (as measured per TAPPI Gurley stiffness test T543pm). For good conformability, cross-direction (CD) Gurley should not exceed about 0.75 times MD Gurley.

Olefin-SPA blends have been found in many respects to be a preferred material to meet the demands of polymeric die-cut label manufacture. The use of olefin-SPA blends in the manufacture of die-cut labels is shown in aforementioned U.S. Pat. No. 5,186,782 and in U.S. application Ser. Nos. 07/839,369 filed Feb. 21, 1992 now abandoned and 07/942,511 filed Sep. 9, 1992, also of common assignee, the disclosures of which are hereby incorporated by reference as if fully repeated herein. The relatively low cost of the olefinic resins, and their high strength allowing for low caliper film, tend to minimize overall material cost. Hot-stretched polypropylene and/or polyethylene provides stiffness in the machine direction even at relatively low-caliper thicknesses for adequate print registration and dispensing while providing sufficiently low tensile modulus and particularly sufficiently high elongation in the cross direction to allow good conformability. Soft polar additives such as EVA improve printability, and also contribute to conformability since they tend to be soft rubbery materials.

Olefin-SPA blends have been found useful to produce, on an economical basis, printable 3.5 mil coextruded labels die-cut from uniaxially hot-stretched film that are durable, strong and water-resistant, and that generally have good structural and surface properties and performance characteristics, and such labels have been manufactured and sold prior to the present invention. The inclusion of the soft polar additive contributes importantly to label printability, conformability and die-cuttability without too much degrading the stiffness and tensile strength of the final uniaxially oriented product. Uniaxial stretching also makes an important contribution to performance by creating substantial differentials between machine direction (MD) and cross direction (CD) stiffnesses, tensile moduli, elongations, and other properties.

However, poor abrasion resistance has been a problem for such uniaxially oriented olefin-SPA blend films of the prior art. While improving the abrasion resistance of such films promised to expand their markets, the use of strengthening agents to possibly improve abrasion resistance appeared to be ruled out because, in strengthening the film, such agents would increase stiffness and tensile modulus in both MD and CD directions, and in particular would be expected to destroy conformability of the film.

Therefore, strengthening agents such as "compatibilizers" have not been used for uniaxially oriented olefin- SPA blend films, even though use of compatibilizers has long been known for strengthening various resinous film-forming materials comprising incompatible or immiscible blends of polar additives and base materials. Examples of the use of compatibilizers to couple two immiscible film phases together and thereby increase the strength of the film are found in U.S. Pat. Nos. 4,410,482; 4,615,941, 4,770,837 and 5,151,309. As just indicated, to the extent that similar use of compatibilizer in uniaxially oriented olefin-SPA blend films might favorably change some physical properties, properties such as cross-direction elongation would be expected to change in an unfavorable direction in rough proportion to the degree of favorable change of other properties, so that what would be gained, for example, in stiffness would be lost in conformability.

SUMMARY OF THE INVENTION

The present invention involves the discovery that use of compatibilizer in uniaxially hot-stretched olefin-SPA blend films of the kind used in label manufacture in the prior art enhances abrasion resistance while changing the physical properties of the film in a directionally selective manner that preserves conformability of the film. Use of the compatibilizer increases MD physical properties, including stiffness and tensile modulus, with little or no degradation of CD elongation and without violating the ratio relationship between MD and CD stiffness required for good label conformability. Even though properties such as stiffness and tensile modulus may be substantially increased by use of compatibilizers, CD elongation does not change significantly and good label conformability is preserved.

The uniaxially hot-stretched olefin-SPA blend films of the kind used in label manufacture in the prior art required a core layer having a relatively high proportion of the soft polar additive to give adequate conformability. Such films were typically 3.5 mils thick with relatively thin skin layers and a relatively thick core layer. The invention involves the further concept that, in view of the degree of improvement in stiffness and tensile modulus with substantially no degradation of CD elongation through use of compatibilizer in the 3.5 mil films of the type described, it might be possible with compatibilizer to both reduce film caliper (down to say 2.5 mils, a decrease of over 28%) and reduce percentage content of the relatively expensive soft polar additive. Trying to maintain film properties in balance generally gets more difficult as film thickness is reduced, so going below 3 mils presented a challenge. However, it was hoped that lower caliper uniaxially hot-stretched films with higher percentage content of the relatively inexpensive and relatively strong olefinic base material could have adequate stiffness and die-cuttability, and CD properties again might remain relatively unaffected by the addition of the compatibilizer. This was confirmed by experimental tests. The result turns out to be a film which saves costs in two respects. Percentage content of the relatively expensive soft polar additive is reduced. Also, total material usage is reduced through caliper reduction. Both cost reductions are accomplished while maintaining good printability, print registration, dispensability, conformability, die-cuttability, and matrix strippability.

In field experience in the prior art, when labels die cut from film of extruded olefin-SPA blend that had been hot-stretched were applied to some types of containers, the containers rubbing against each other when unprotected during transportation or on some filling lines tended to experience flaking off of ink, particularly along the label sides that ran in the machine direction. It is believed that this effect was caused by formation of fibrils within the film material (formation of strand-like complexes of the immiscible phases of the blend) occurring when the films were hot stretched. These fibrils are susceptible to being pulled out of the surface by the abrasive action of the rubbing containers. This may be referred to as "fibrillation". Greatly improved results in this respects are accomplished by the present invention.

An interesting finding believed to relate to film fibrillation is that olefin-SPA blend films are resistant to abrasion when extruded, but lose such resistance when uniaxially oriented as by hot-stretching following extrusion. Extruded non-stretched films achieve good abrasion resistance ratings; the same extruded films, when uniaxially oriented, give poor ratings.

BRIEF DESCRIPTION OF THE DRAWINGS

The invention will be more fully understood from the following more detailed description taken together with the accompanying drawings which are highly schematic, and in which FIGS. 1A–1D schematically illustrate certain manufacturing steps related to the environment of the invention.

DETAILED DESCRIPTION OF THE INVENTION

The context of the invention set forth in this detailed description is similar to the context of the invention in copending U.S. patent application Ser. No. 08/055462 filed Apr. 29, 1993 which also deals with conformable labelling of flexible and rigid substrates, and to manufacture of die-cut labels for such uses; however, such prior patent application discloses an invention pertaining to certain stiffness ranges and release value ranges for both cast and blown films, whereas the present invention relates to the novel use of coupling agents in uniaxially hot-stretched cast-extruded films that consist of or comprise film layers of olefin-EVA blends. However, due to the similarity in context, some of the following contextual description parallels that of said copending application.

Figure 1A:
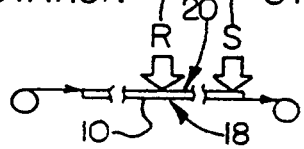
Figure 1B:
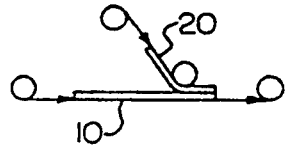

In the manufacture of label stock according to the invention, liner or carrier stock 10 (FIGS. 1A–1D) may be provided. The liner or carrier stock 10 may comprise a multilayer liner made for example as disclosed in U.S. Pat. No. 4,713,273, the disclosure of which is incorporated herein by reference, or may be conventional liner or carrier consisting of a single paper or film layer which may be supplied in roll form. If it has not been previously provided with a release coating and does not itself include components to inherently generate a release surface at its adhesive-contacting face, the liner or carrier 10 may be coated with a release coating at station R, as shown in FIG. 1A. If a release coating is applied, it is dried or cured following application by any suitable means (not shown). If the liner or carrier 10 comprises a plastic extrudate, then prior to application of the release coating at station R, the formed films may be hot-stretched to provide orientation of the liner or carrier 10.

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, which now remains permanently joined to the facestock.

Thus, as indicated in FIG. 1A, adhesive may be applied at station S following drying or cure of the release coat previously applied at station R. This may be a tandem coating operation, or the adhesive coating may be on a separate coating line. Or, the adhesive may be applied at some later time prior to the combining of the release liner or carrier 10 with facestock. The combining of the liner or carrier with a facestock 20 is diagrammatically illustrated in FIG. 1B. Alternatively, the adhesive may be coated directly on the facestock 20 prior to the combining of the face stock and liner or carrier.

In some applications, the adhesive may be a heat-activated adhesive or a hot-melt adhesive such as used in in-mold label applications, as distinguished from a pressure-sensitive adhesive, in which case there may be no need for the provision of a release liner or inherent releasability such as is required when using a pressure-sensitive adhesive.

The label facestock is printed at a printing station (not shown) prior to being die-cut into individual labels. The printing step may occur before or after the combining of liner and facestock, but will precede the die-cutting of the facestock into individual labels. The film must remain in accurate register between printing steps (for example, between successive impressions in different colors) in order that image or text be of high quality, and between printing and subsequent die-cutting in order that image or text be located properly on the labels. The film is under tension during printing, and may be subjected to some increase in temperature, as for example when UV inks are cured, and must not stretch significantly in the machine direction. The MD tensile properties of the facestock film are particularly important when a polymeric film liner is used or when no liner is required.

Figure 1C:
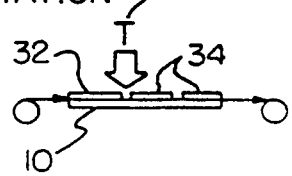
Figure 1D:
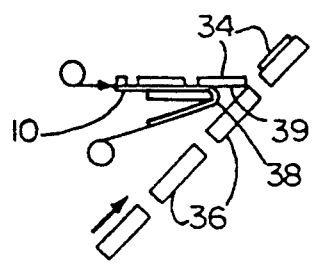

FIG. 1C diagrammatically illustrates the die-cutting of the facestock 20, at a station T, into a series of spaced pressure-sensitive labels 34 carried by the release liner or carrier 10. This step may be performed by rotary cutting dies in a well known manner and involves the stripping of the ladder-shaped matrix (not shown) of waste or trim surrounding the formed labels when they are die cut (the "rungs" of the ladder representing the spacing between successive labels). The labels then remain on the liner in spaced relation with each other, as shown. FIG. 1D illustrates the application of the labels 34 to passing workpieces 36 by use of a peel-back edge 38 to dispense the labels 34 by progressively removing the liner or carrier from them to thereby expose the adhesive side 39 of the labels and project the labels into contact with passing workpieces 36.

In the context of the present invention, the workpieces 36 may constitute plastic squeeze bottles or other articles which are flexible in nature and therefore require labels that avoid or minimize the natural tendency of labels that are adhered to such objects to wrinkle upon flexing of the substrates. The workpieces 36 may also comprise glass bottles or other rigid articles tending to have an irregular surface and therefore require labels that are flexible and tend to closely adhere to the surface without bridging local surface depressions.

It will be understood that the operations shown in FIGS. 1A to 1D may be done at different locations by different manufacturers, or they may be combined. For example, the steps of FIG. 1A may be performed by a liner and adhesive manufacturer, the steps of FIGS. 1B and 1C may be performed by a label manufacturer on one continuous pass rather than being interrupted by a wind/unwind sequence as illustrated, and the steps of FIG. 1D may be performed by a packager of manufactured products.

Facestock which is formed into labels is usually wound and unwound in roll form, and is therefore one form of what is known as "roll stock" or "roll facestock", and the accompanying liner or carrier is called "roll liner".

Figure 2:
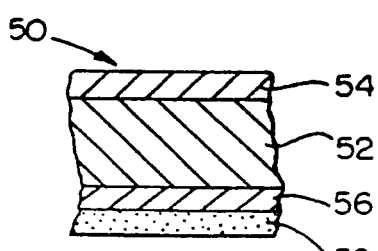
FIG. 2 and 3 are fragmentary cross-sections of facestock constructions usable in the practice of the invention.
Figure 3:
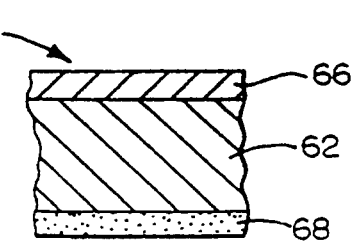

Examples of multilayer film facestocks which may be used in the invention are seen in FIGS. 2 and 3. In FIG. 2, a multilayer web construction, generally indicated by the reference numeral 50, comprises a coextrudate including a core layer 52, a skin layer 54 on the face side of the coextrudate, and a skin layer 56 on the inner side of the coextrudate opposite the face side. Combined on the inner side of the coextrudate is a pressure-sensitive adhesive layer 58.

The layers of the coextrudate of FIG. 2 comprise olefin-SPA blends, and are simultaneously extrusion cast from a suitable known type of coextrusion die, and are adhered to each other in a permanently combined state to provide a unitary coextrudate.

The presently preferred materials for skin and core layers comprise blends of (1) polypropylene or copolymers of polypropylene and polyethylene and (2) ethylene vinyl acetate (EVA). The preferred weight ratios are different as between skin and core, as more fully described below.

Another material for the core layers is polyethylene of low, medium or high density between about 0.915 and 0.965 specific gravity. However, preferably olefin-EVA blends are used in the core layer, and preferably, the olefinic base materials of the olefin-EVA blends are wholly or primarily polypropylene which has a higher melting point than polyethylene and better resists deformation if the film is subjected to increase in temperature, for example when UV-curable inks are used for printing.

Inorganic fillers may be used to provide opaque film label stock. Useful fillers include calcium carbonate, titanium dioxide and blends thereof.

EVA-olefin blends are presently preferred materials for both the core layer 52 and the skin layers 54 and 56. For good printability, EVA content of the skin layers should be above 25% preferably between about 30% and 60% and most preferably about 40% to 50%. While EVA content can be slightly higher, the olefin is the less costly component so nothing is to be gained by further increasing EVA content, and furthermore too high proportions of EVA or attempted use of 100% EVA film for the skins would cause severe fabrication problems due in part to the disparity between stretching temperatures of EVA and polypropylene. While printability of the inner skin will often not be required, the presence of EVA improves anchorage of label adhesive to the inner skin, or may allow or improve the functioning of the inner skin itself as a heat-activated adhesive, for example in in-mold applications. Furthermore, it is generally desirable that the two skin layers be "balanced" and of similar or identical makeup so that the composite film will have no tendencies to curl or otherwise reflect an unbalanced structural nature. A preferred EVA is 19% vinyl acetate EVA, having the following physical characteristics: tensile modulus (1% secant), 5300 psi; ultimate tensile strength, 2150 psi; ultimate elongation, 730%; hardness, 87 Shore A.

For contact-clear film label applications, the preferred core layer is an EVA-olefin blend without filler. For opaque film label applications, the preferred core layer is the same olefin-EVA blend filled with a mixture of calcium carbonate and titanium dioxide. The presently preferred skin layer is an EVA-olefin blend for both contact-clear and opaque label film applications.

As indicated, EVA is presently preferred as the soft polar additive. In particular, EVA containing 19% vinyl acetate has been found satisfactory and is used in the various films and tests described below. Although EVA is presently most preferred, alternative materials include ethylene methyl acrylate (EMA) and acrylonitrile butadiene rubber, which are also random copolymers of an olefin and a more polar moiety that are immiscible in and softer than the olefinic base material of the olefin-SPA blend.

While the foregoing examples of facestocks have employed skin layers on each side of the core, there may be instances where a skin layer is employed only on the outer side of the construction, such as the construction 60 shown in FIG. 3, which employs the single skin layer 66 on the outer side of a core layer 62. In this instance, the pressure-sensitive adhesive layer 68 is directly adjacent the core layer.

Figure 4A:
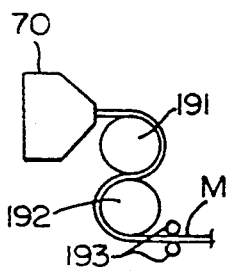
FIGS. 4A–4C schematically illustrate cast-film extrusion and ensuing line processes pertinent to the invention.

From a method standpoint, the charges of film-forming resin for the layers of the construction may be coextruded to form an extrudate. Thus, the charges may be prepared for extrusion or coextrusion through an extrusion die 70 and flat film casting, as schematically illustrated in FIG. 4A. The extruded film is cast on a first cooling roll 191, continues around a second cooling roll 192, and is advanced by pull-off rolls 193.

Figure 4B:
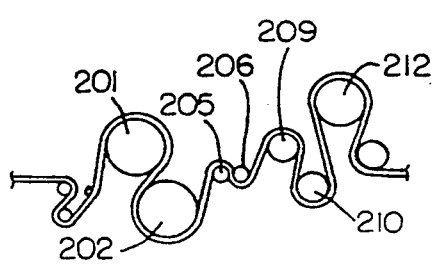
Figure 4C:

As mentioned earlier above, stiffness of the film is important to proper dispensing at higher line speeds. FIG. 4B illustrates a hot-stretching station at which the Gurley stiffness of the flat stock M is increased in the machine direction, preferably at a stretch ratio of between 2 and 9, more preferably between 3.5 and 7, and most preferably at about 5. The MD tensile modulus of the film is also increased by the stretching step, contributing to dimensional stability and good print registration. After passing around a pair of pre-heat rolls 201, 202 which heat the stock above its glass transition temperature, the stock is stretched at the reach between the pre-heat rolls and the pull-roll pair 205, 206, the latter rotating at a multiple of the speed of the pre-heat rolls, corresponding to the stretch ratio, say 5 to 1. The stock then passes over the annealing rolls 209, 210 at which it is annealed or heat-set, and finally passes over the chill roll 212 to complete the hot-stretch operation. The stock may then be taken up in roll form as seen in FIG. 4C.

In the context of the present invention, each immiscible olefin-SPA blend which is extrusion cast into a layer of the film also has a compatibilizer charge heated and blended therewith prior to extrusion. The compatibilizer or coupling agent comprises a polyolefin copolymerized with or grafted by a polar reactant. Upon extrusion through the hot die, the soft polar additive and the olefinic base material are chemically coupled by the compatibilizer or coupling agent.

When the preferred EVA is used as the polar additive, and the olefinic base material of the EVA-olefinic blend is wholly or primarily polyethylene, the grafted polymer of the compatibilizer may be polyethylene, for example the compatibilizer may be an acrylic acid modified polyethylene graft copolymer. When, as presently preferred, the olefinic base material of the olefin-EVA blend is wholly or primarily polypropylene, the grafted polymer of the compatibilizer may be polypropylene, for example the compatibilizer may be an acrylic acid modified polypropylene graft copolymer (e.g. Polybond(R) 1003, BP Chemicals, Hackettstown, N.J.) or a maleated polypropylene graft copolymer (e.g. Polybond (R) 3001, BP Chemicals). These coupling agents are generally of a type heretofore known to be useful to enhance the physical and thermal properties of polyolefins filled or reinforced with glass, mica or talc, or useful to promote adhesion between polyolefins and glass, wood, paper, leather, and polar polymers including polyesters, polyurethane, ethylene vinyl alcohol (EVOH) and nylon. These compatibilizers may be referred to as carboxylated or maleated polyolefins. It is believed that it has not been previously known that such compatibilizers can function to reduce fibrillation associated with hot-stretched films formed of olefin-SPA blends while still allowing the films to be conformable.

Charges for one or more film layers are combined in blenders prior to extrusion to provide a molten blend including the compatibilizer. This melt is then extruded and hot stretched to form an oriented label film (which may constitute a monolayer EVA-olefin blend film or may preferably comprise one or more coextruded additional layers) exhibiting a lower degree of fibrillation than an oriented film formed under the same conditions from the same charges for the same EVA-olefin blend or blends in the same relative proportions to each other but without the compatibilizer charge.

Following extrusion, hot stretching and annealing, the film is cut into individual labels, all edges of which have an improved degree of abrasion resistance. The film may be printed to the edges of the die-cut labels with relatively little or no edge flaking of the ink when the labels are die-cut and then subjected to edge abrasion. The charges may be extruded in the absence of an opacifier to yield a film of improved clarity.

Comparative tests were made of films having the general construction of FIG. 2 (without adhesive). The films were formed by cast film extrusion as illustrated in FIG. 4A. In each instance, the thickness ratio of the skin-core-skin layers of the extrusion was 10/80/10. The extruded films were then heated, stretched in the machine direction only, and heat-set or annealed, as illustrated in FIG. 4B. In each instance, a draw ratio of 5 to 1 was used, so that hot-stretching in the machine direction was 5 to 1. There was essentially no stretching in the cross-direction. In each instance, the core layer remained at about 80% of total thickness, and each of the skin layers was 10% of total thickness. The final overall thickness of the film was 3.5 mils. The extrusion-cast uniaxially hot-stretched films formed of EVA-olefin blends with use of compatibilizer were compared with similar films formed of the same or very similar blends formed without compatibilizer.

Blends used for the control film of Table 1 (no compatibilizer) were: for the core layer, 60% random polypropylene-polyethylene copolymer (3.2% ethylene, 80

Rockwell R hardness of copolymer) and 40% EVA; and for each of the skin layers, a blend of 50% polypropylene homopolymer (97 Rockwell R hardness) and 50% EVA. Proportions are by weight. Addition of compatibilizer proportionately reduces the percentage content of EVA and base material in the compatibilized films.

The blends used for the test film of Table 1 were generally similar to those of the uncompatibilized film, except that 10% by weight of the core charge and 10% by weight of each of the skin charges was maleic anhydride modified polypropylene graft homopolymer ("Polybond 3001"). The core layer comprised 55% random polypropylene-polyethylene copolymer, 35% EVA and 10% Polybond 3001. Each skin layer comprised 45% homopolymer propylene, 45% EVA and 10% Polybond 3001. The characteristics listed in the following Table 1 were then measured, with the comparative results indicated. Tensile modulus (1% secant) and ultimate tensile strength were measured using ASTM test procedures D882 for tensile properties of thin plastic sheeting. Stiffness was measured using TAPPI test T543pm for testing stiffness of paper using a Gurley stiffness tester. Abrasion resistance was measured using TAPPI Taber abrasion resistance test T476ts, using a Standard Abrasion Tester as the abrader. Results were measured after 100 cycles. The Taber numbers given are on a scale of 1 to 10, with 1 being the most favorable rating, according to a continuum of observed states as described below, with interpolation of intermediate values for observed states intermediate those described:

1 Slight hazing of film surface.
3 Hazing of film now accompanied by localized roughening, slight "bailing" of micro-fibril ends.
5. Onset of micro-fibrils. Fibrils look like small hairs, no greater than ⅛" long.
8. Onset of macro-fibrils. Fibrils are now over ¼" in length and cover at least 10% of the test area.
10. Macro-fibrils now cover at least 50% of the test area Ink chip rating was obtained using an L.A.B. shaker table, testing in conformance with ASTM D999 ("Vibration Testing of Shipping Containers") and The National Safe Transit Association (NSTA) Project 1A ("Procedure for Testing Packaged Products, Weighing Under 100 Pounds or 45.36 Kgs."). The numbers given refer to the number of chips per label after a five minute shaker cycle.

TABLE 1

|  | Control | Test Film | % Change |
| --- | --- | --- | --- |
| Caliper, mils | 3.5 | 3.5 | N/A |
| Gurley Stiffness |  |  |  |
| MD | 30 | 41 | +36% |
| CD | 15 | 19 | +27% |
| Tensile Modulus, psi (1% secant) |  |  |  |
| MD | 140,000 | 193,000 | +38% |
| CD | 55,000 | 70,000 | +27% |
| Ultimate Tensile Strength, psi |  |  |  |
| MD | 16,400 | 20,600 | +26% |
| CD | 2,400 | 2,900 | +21% |
| Ultimate Elongation, % |  |  |  |
| MD | 75 | 58 | −23% |
| CD | 640 | 648 | +1% |
| Abrasion resistance |  |  |  |

TABLE 1-continued

|  | Control | Test Film | % |
| --- | --- | --- | --- |
| Taber Rating | 7 | 4 | −43% |
| Ink Chip Rating | 42 | 20 | −52% |

In this test, the control film is identical to prior art olefin-EVA blend film commercially sold and used, for example Fasson "FasClear" manufactured by Avery Dennison Corporation. As indicated, use of a compatibilizer in the test film substantially improved abrasion resistance (Taber rating number decreased), increased machine-direction (MD) stiffness by more than a third and MD tensile strength by more than 25%, but critically, cross-direction (CD) physical values generally changed a moderate amount and/or in a favorable direction. The slight change in CD elongation was in a favorable direction. In particular, the CD tensile modulus of the compatibilized film remained in a range with a high end in the vicinity of 100,000 psi (in fact the value is only 70,000 psi in this instance), and CD Gurley stiffness remained well below 0.75 times MD Gurley stiffness and below a value of 20, so that conformability of the resulting labels remained acceptable.

The fact that CD tensile modulus and Gurley stiffnesses can remain within the ranges mentioned is an important consideration, since high tensile modulus values too far above the top of this range generally are associated with unacceptable conformability for flexible label substrates such as squeeze bottles. The fact that the ratio of CD Gurley to MD Gurley remains less than 0.75 is also important because values above 0.75 are similarly associated with unacceptable conformability for flexible label substrates. Related conformability problems have been encountered in respect to rigid substrates such as provided by glass bottles. Films are not fully acceptable for such applications if the films are not sufficiently conformable to prevent bridging of surface depressions that result from the bottle-forming process. Such bridging results in actual or apparent air bubbles which greatly detract from the appearance of the label.

As mentioned earlier, an interesting finding believed to relate to film fibrillation is that olefin-SPA blend films are resistant to abrasion when extruded, but such resistance is degraded when the film is uniaxially oriented as by hot-stretching following extrusion. Extruded non-stretched films achieve high abrasion-resistance. ratings, although their MD stiffness is too low for proper dispensing. For example, when a film of the same blends as the control film of Table 1 is extrusion-cast under the same conditions, but is allowed to remain unoriented instead of being uniaxially oriented by hot stretching, it exhibits a Taber rating of 1 when tested for abrasion resistance. This is to be contrasted with the Taber rating of 7 indicated in Table 1 for the same film when uniaxially oriented.

In order to further investigate improvement in abrasion resistance by use of compatibilizer, additional comparative tests were conducted. These are summarized in the following table:

TABLE 2

| Test | Core proportns | Core materials | Skin proportns | Skin materials | Taber rating |
| --- | --- | --- | --- | --- | --- |
| 1 | 60/40/0 | B1 P __ | 50/50/0 | B2 P __ | 7 |
| 2 | 60/40/0 | B1 P __ | 45/45/10 | B2 P C1 | 5 |
| 3 | 55/35/10 | B1 P C1 | 45/45/10 | B2 P C1 | 4 |

TABLE 2-continued

| Test | Core proportns | Core materials | Skin proportns | Skin materials | Taber rating |
|---|---|---|---|---|---|
| 4 | 45/45/10 | B1 P C1 | 45/45/10 | B2 P C1 | 4 |
| 5 | 60/40/0 | B1 P _ | 40/50/10 | B2 P C2 | 6 |

Key:
(Proportions are given in the following order: base material/polar additive/coupling agent)
Base materials:
B1 Random polypropylene-polyethylene copolymer (3.2% ethylene)
B2 Polypropylene homopolymer
Polar Additive
P Ethylene vinyl acetate polymer
Coupling agent
C1 PolyBond(R) 3001
C2 PolyBond(R) 1003

Test 1 in this table is the same film as the control in Table 1 above. As indicated by the key accompanying the table, in Tests 2 and 3 abrasion resistance is improved (Taber rating is decreased) when compatibilizer is added to the skin layers only (Test 2), and is still further improved when compatibilizer is added to the core layer as well as the skin layers (Test 3). Test 4 differs from Test 3 only in that the latter slightly varies the proportions of base material and polar additive in the core layer. As indicated by the unchanged Taber rating, this change makes substantially no difference in abrasion resistance. Test 5 is closest to Test 2 but uses the other compatibilizer listed in the table key, and slightly adjusts the proportions of base material and polar additive in the outer skins. As indicated by the increased Taber number of Test 5, these changes adversely affected abrasion resistance.

A comparison of the results of Tests 2 and 3 of Table 2 clearly indicates that the use of compatibilizer in the film core as well as in the skins improves resistance to abrasion. This result is surprising, because abrasion resistance would seem to be associated only with the skin layer that is abraded, since only that skin layer is adjacent the outside or facial surface of the film, but as indicated, such is not the case and the presence of compatibilizer in the core layer has a significant and beneficial effect. It is conjectured that the compatibilizer may contribute to the strength of bond across the interface between the skin and core layers, and that this in turn may favorably affect Taber rating.

As mentioned above, the test results such as those indicated in Table 1 seemed to indicate that it might be possible with compatibilizer to both reduce film caliper (down to say 2.5 mils, a decrease of over 28%) and reduce percentage content of the relatively expensive soft polar additive. It was hoped that lower caliper uniaxially hot-stretched films with higher percentage content of the relatively inexpensive and relatively strong olefinic base material could have adequate stiffness, and CD elongation again might remain relatively unaffected by the addition of the compatibilizer. This was confirmed by the tests of Table 3, which were generally similar to those of Table 1 except that the overall final film thickness was 2.5 mils, and the blend used for the core layer of the control film was: 90% random polypropylene-polyethylene copolymer (3.2% ethylene) and 10% EVA, and for the test film, 85% random polypropylene-polyethylene copolymer (3.2% ethylene), 10% EVA and 5% Polybond 3001. The proportions for each skin layer for the control film were 50% homopolymer propylene and 50% EVA, and for the test film, 40% homopolymer propylene, 50% EVA and 10% Polybond 3001. Test results were as follows:

TABLE 3

|  | Control | Test Film | % Change |
|---|---|---|---|
| Caliper, mils | 2.5 | 2.5 | N/A |
| Gurley Stiffness |  |  |  |
| MD | 18 | 19 | +6% |
| CD | 11 | 11 | +0% |
| Tensile Modulus, psi (1% secant) |  |  |  |
| MD | 204,000 | 215,000 | +5% |
| CD | 94,000 | 103,000 | +10% |
| Ultimate Tensile Strength, psi |  |  |  |
| MD | 23,500 | 25,600 | +9% |
| CD | 3,200 | 3,500 | +9% |
| Ultimate Elongation, % |  |  |  |
| MD | 56 | 67 | 20% |
| CD | 505 | 491 | −3% |
| Abrasion resistance |  |  |  |
| Taber Rating | 5 | 3 | −40% |
| Ink Chip Rating | 19 | 18 | −11% |

In this test, the control film is not a prior art film. It is considerably thinner than prior-art olefin-EVA blend films commercially sold and used, and differs from them in other ways. It is included for comparative purposes only. As indicated, use of a compatibilizer in the test film again substantially improved abrasion resistance (Taber rating number decreased), but importantly CD physical values again generally changed a moderate amount and/or in a favorable direction. The change in CD elongation was small, although in an unfavorable direction. In particular, the CD tensile modulus of the compatibilized film remained in a range with a high end in the vicinity of 100,000 psi, and the ratio of CD to MD Gurley stiffness remained below 0.75, so that conformability of the resulting labels remained acceptable.

To further describe the films, CD values are given as follows: For the control film, CD tensile at yield is 3400 psi, CD elongation at yield is 12%; for the test film, CD tensile at yield is 3300 psi, CD elongation at yield is unchanged at 12%. No yielding was observed in the machine direction.

It will be noted from Table 3 that the Taber rating of the 2.5 mil test film is even lower than that of the 3.5 mil test film of Table 1. Even though there is a relatively small proportion of EVA in the core, the presence of the EVA in the compatibilized core appears to play an important role in contributing to abrasion resistance as well as conformability and die-cuttability of the uniaxially hot-stretched olefin-EVA blend film.

For thin films such as the test film of Table 3, it is preferred that the EVA content of the core blend be between about 5% and 15%. A content of about 10% EVA is presently preferred and was used in the test, as indicated earlier.

The directionally selective modification of physical properties achieved by the compatibilized, uniaxially oriented films of the invention is reflected in the novel combinations of film physical characteristics of the compatibilized test films of Tables 1 and 3. In both test films, MD tensile modulus is $\geq 193{,}000$ psi, CD modulus is $\leq 103{,}000$ psi, MD elongation is $\leq 67\%$, and CD elongation is $\geq 491\%$.

It should be evident that this disclosure is by way of example, and that various changes may be made by adding, modifying or eliminating details without departing from the fair scope of the teaching contained in this disclosure. The invention therefore is not limited to particular details of this disclosure except to the extent that the following claims are necessarily so limited.

What is claimed is:

1. In a method of manufacturing longitudinally-oriented-film die-cut conformable labels whose layers are formed from olefin-SPA blends, said method comprising the steps of heating and melting said blends, with or without filler such as titanium dioxide opacifier, extrusion-casting said molten blends into a layered film, and hot-stretching and annealing said film to form a uniaxially oriented label film and impart differentials between machine direction and cross direction stiffness of the uniaxially oriented film such that machine direction stiffness is greatest, and between machine direction and cross direction elongation such that cross direction elongation is greatest, the improvement comprising strengthening said film in a strengthening step that is directionally selective with respect to film elongation, so as to not substantially affect CD elongation or degrade film conformability, said strengthening step comprising performing said extrusion-casting, hot-stretching and annealing steps with a compatibilizer in said blends, whereby the resulting film both (1) remains conformable and (2) has a higher degree of resistance to abrasion than a reference film of the same thickness formed under the same conditions from the same charges of the same olefin-SPA blends in the same relative proportions but without said compatibilizer, and cutting the film into individual labels.

2. A method as in claim 1 wherein said extrusion step extrudes a core layer and at least one skin layer corresponding to the faces of the formed labels, including the step of selecting an extrusion charge for extruding said skin layer that comprises between about 35% and 60% polar additive.

3. A method as in claim 2, said step of extruding including extruding the film layers at such thicknesses that said hot-stretching reduces the overall thickness of the extruded label film to less than 3 mils, and including the step of selecting an extrusion charge for extruding said core layer that comprises between about 5% and 20% polar additive.

4. In a method of manufacturing longitudinally-oriented-film die-cut conformable labels whose layers are formed from olefin-SPA blends, said method comprising the steps of heating and melting said blends, with or without filler such as titanium dioxide opacifier, extrusion-casting said molten blends into a layered film, and hot-stretching and annealing said film to form a uniaxially oriented label film and impart differentials between machine direction and cross direction stiffness of the uniaxially oriented film such that machine direction stiffness is greatest, and between machine direction and cross direction elongation such that cross direction elongation is greatest, the improvement comprising strengthening said film in a strengthening that is directionally selective with response to film elongation, so as to not substantially affect CD elongation or degrade film conformability, said strengthening step comprising performing said extrusion-casting, hot-stretching and annealing steps with a compatibilizer in at least one of said blends, whereby the resulting film both (1) remains conformable and (2) has a higher degree of resistance to abrasion than a reference film of the same thickness formed under the same conditions from the same charges of the same olefin-SPA blends in the same relative proportions but without said compatibilizer, and cutting the film into individual labels.

* * * * *